United States Patent [19]

Ciarniello et al.

[11] 4,088,940
[45] May 9, 1978

[54] DEVICE FOR CUTTING OUT LOADS IN A GENERATOR AND BATTERY FED PLANT

[75] Inventors: Giorgio Ciarniello, Vasto; Oscar De Lena, Termoli, both of Italy

[73] Assignee: Societa Italiana Vetro SIV S.p.A., Vasto, Italy

[21] Appl. No.: 577,563

[22] Filed: May 14, 1975

[30] Foreign Application Priority Data

May 15, 1974 Italy .................................. 51009 A/74
Feb. 12, 1975 Italy .................................. 48126 A/75

[51] Int. Cl.² ............................................... H02J 7/14
[52] U.S. Cl. ................................. 322/8; 307/10 BP; 307/38; 322/99
[58] Field of Search ....................... 320/13, 14, 39, 40, 320/48, 45; 307/10, 10 BP, 38, 35; 322/99, 7, 8

[56] References Cited

U.S. PATENT DOCUMENTS

| | | | |
|---|---|---|---|
| 3,321,754 | 5/1967 | Grimm et al. | 320/48 UX |
| 3,474,296 | 10/1969 | Rickey | 320/40 X |
| 3,522,481 | 8/1970 | Terzic | 320/40 X |
| 3,656,045 | 4/1972 | Frezzolini et al. | 307/10 BP |
| 3,656,135 | 4/1972 | Ruff | 320/48 UX |
| 3,868,559 | 2/1975 | Hill et al. | 307/10 R |

*Primary Examiner*—Robert J. Hickey
*Attorney, Agent, or Firm*—Browdy and Neimark

[57] ABSTRACT

A device for cutting out non-essential loads in a generator and battery-fed electric plant includes a voltage detecting unit connected across the terminals of the battery. The detecting unit may be a relay. Whenever the voltage at the terminals falls below a predetermined level, the detecting unit effects the disconnection of the non-essential loads from the terminals of the battery and generator.

2 Claims, 7 Drawing Figures

DEVICE FOR CUTTING OUT LOADS IN A GENERATOR AND BATTERY FED PLANT

The invention refers to a device which automatically cuts out non-essential loads in a generator and storage-battery fed electric circuit when the overall load on the circuit absorbs more power than the power fed by the generator to the battery, in order to prevent the battery charge from sinking below a critical level, i.e. the level below which the battery would become irremediably damaged.

The invention has its main field of application in motor vehicles, to whose electric circuits there are applied additional, non-essential fixtures such as air conditioners, electrically heated windows, a refrigerator etc.

The power plant of modern motor craft is designed to handle under normal operating conditions such additional loads without letting the charge of the storage battery sink below this critical level. However, conditions may occur in which, because of the simultaneous insertion of too many loads into the circuit or because of a reduction in the generator output, the electric power absorbed from the storage battery may exceed the power supplied to it by the generator and consequently its charge may sink to a level where the battery is irreparably damaged.

It is true that the electric plant of today's motor vehicles is provided with a warning lamp which lights up when the generator delivers to the storage battery no power or insufficient power because it stands still, is defective or runs at low speed, thereby signalling to reduce the loads on the electric plant of the vehicle. But there occur also conditions, in which the generator, although operating at full capacity, is still unable to deliver to the battery all the power absorbed therefrom by the loads. In this case the warning lamp gives no warning, even after the battery has been discharged beyond the critical level, beneath which it becomes irreparably damaged.

The invention provides a device which automatically switches the non-essential loads off the electric circuit of a motor vehicle in those conditions in which the power absorption of the circuit exceeds the available power supply from the generator and switches them on again when these conditions cease.

BRIEF DESCRIPTION OF THE DRAWINGS

For a purely illustrative and in no way limitative purpose some embodiments of the invention will now be described with reference to the attached drawings, wherein.

DETAILED DESCRIPTION OF THE PREFERRED EMBODIMENTS

Figure 1:
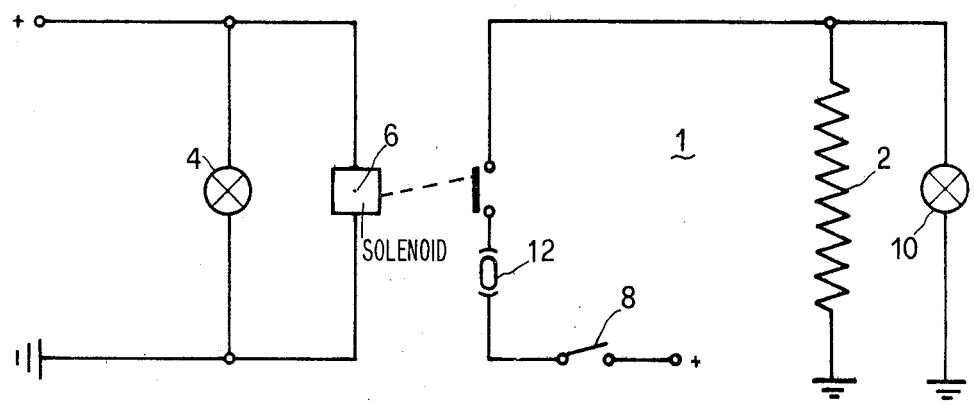
FIG. 1 shows a first embodiment.

The embodiment shown in FIG. 1 is extremely simple and easy to install in existing motor vehicle circuits. In it, the circuit 1 of the non-essential or optional loads, as symbolized by a resistor 2, is controlled by the circuit of the usual warning lamp 4, which lamp lights up when the generator produces no current or runs at a slow speed. The solenoid 6 of a relay is connected in parallel with lamp 4. The current supply generator lighting the lamp 4 also energizes the relay to open the circuit 1. A switch 8 for the manual control of circuit 1, an indicator lamp 10 signalling when said circuit is in operation, and a fuse 12 may complete the circuit 1.

However, when there occur the last mentioned conditions, for instance during night driving, in which, although the generator runs at full speed, the total load on the electric plant of the vehicle, i.e. the sum of the essential plus the optional loads, absorbs more power than the generator can deliver. In such cases no current will flow through the warning lamp 4 nor through the solenoid 6 to switch off the circuit 1 of the optional loads, with the result that their power absorption would cause the battery charge to sink below its critical level.

Figure 2:
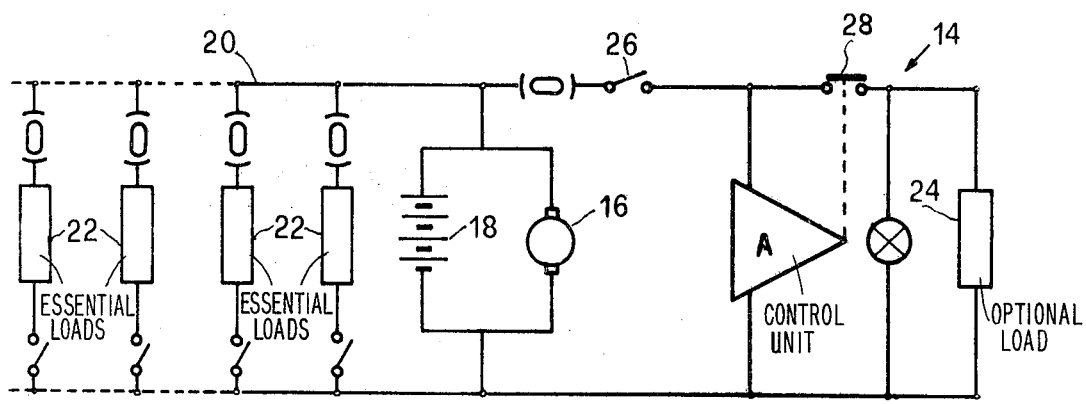
FIG. 2 shows a second embodiment.

The circuitry 14 shown in FIG. 2 obviates this drawback. In addition to this circuit, FIG. 2 shows schematically the generator 16, the storage battery 18 and the known circuit 20, in which the essential loads 22 are inserted through switches and fuses. The circuitry 14, which includes additionally one or more optional loads 24, is closed, when desired, by a manual switch 26. A transistorized control unit A, which will be discussed in greater detail with reference to FIGS. 3 through 7, opens relay contacts 28 of the circuit 14 when the charge of the storage battery 18 passes below the already mentioned critical level and closes them again once the charge rises again beyond it.

Figure 3:
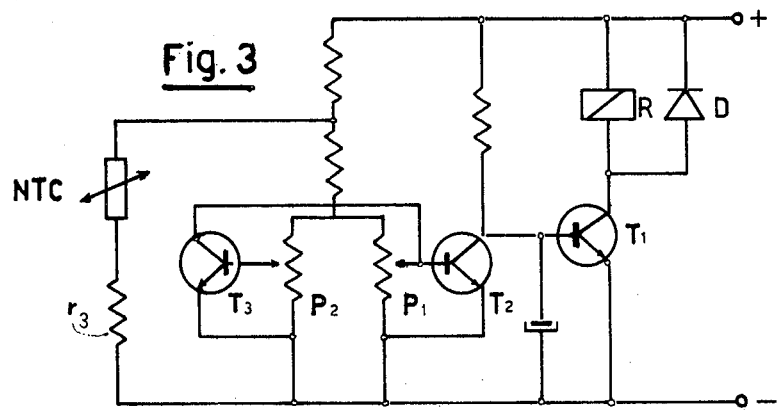
FIG. 3 shows a control circuit for the embodiment of FIG. 2.
Figure 5:
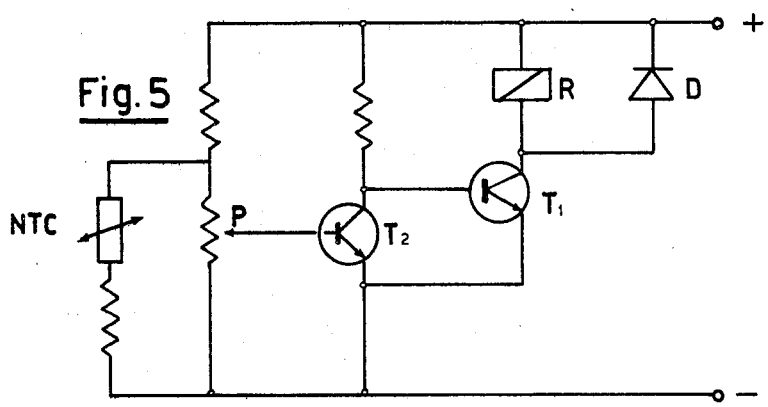
FIG. 5 shows another control circuit for the embodiment of FIG. 2.
Figure 7:
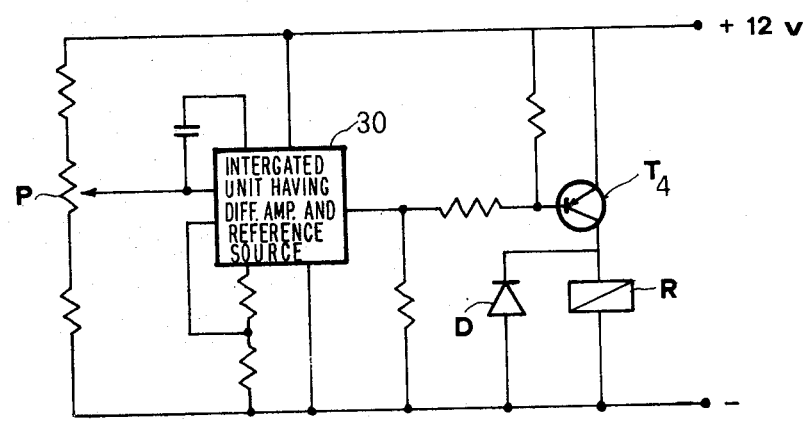
FIG. 7 shows a third possible control circuit for the embodiment of FIG. 2.

Three convenient forms of the control unit A (FIG. 2) are shown in FIGS. 3, 5 and 7.

The circuit of the control unit shown in FIG. 3 has an ON state and an OFF state and furthermore the voltage levels to which the passage from the ON to the OFF state corresponds are adjustable by two potentiometers $P_1$ and $P_2$, and therefore the interval in which the OFF state subsists may be adjusted according to requirements.

Figure 4:
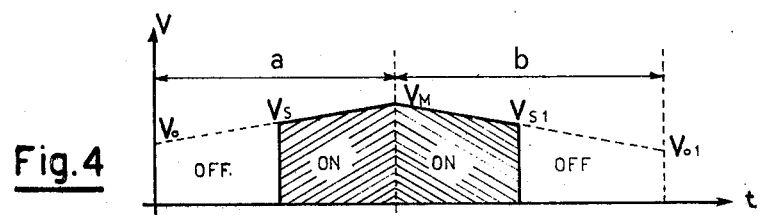
FIG. 4 shows a diagram illustrating the operation of the control circuit of FIG. 3.

FIG. 4 shows a time vs. voltage diagram. The circuit of FIG. 3 is in the ON state above a $Vs$ or $Vs_1$ voltage level respectively during the battery charge period $a$ or the battery discharge period $b$, and is in the OFF state for voltage values lower than these voltage levels. Therefore the optional levels will be inserted into the circuit only when the net voltage lies above said threshold voltages $Vs$ and $Vs_1$. As stated, these threshold voltages are adjustable by the potentiometers $P_1$ and $P_2$.

It is known that a storage battery (such as a lead battery) has, during the charging phase, from 2.2 V/cell to 2.6 V/cell, while during the discharge stage its voltage output is from 2.2 V/cell to 1.8 V/cell and for lower values the battery is in the discharge state and, if in this state more power is absorbed from it, its cells become irreversibly damaged.

So, for instance, the circuit of FIG. 3 may control the insertion of charges only at a predetermined level, for instance from 13.2 V to 15.6 V for a 12 V lead battery, while for voltages below 13.2 V said optional charges are excluded.

The unit circuit shown in FIG. 3 further permits two threshold values for each charging period and each discharging stage in order to utilize a change of state of the final relay R each time these threshold values are exceeded. Therefore, by using the contacts 28 of the relay R, by the change of state of said relay one may control the switching-in and switching-off of the optional loads, and, below the lower threshold values $V_o$ and $V_{o_1}$, one may obtain, by the installation of an optical or acoustical device emitting a warning signal in the case of a discharge of the battery for unforeseen reasons (such as shortcircuits, loads fed but not controlled by the units), the result of realizing, in addition to an automatic safeguard, also a control which signals that the battery is being discharged.

In the circuit of FIG. 3, the variation of the feed voltage causes a variation of the base potential of the transistors $T_2$ and $T_3$ so as to carry them into conduction in relation to predetermined threshold levels established by the potentiometers $P_1$ and $P_2$ and by switching the power transistor $T_1$, which energizes the relay R.

Furthermore the circuit is fitted with a safety device to safeguard it against thermal surges thanks to a thermistor NTC, while a diode D protects the transistor $T_1$ from the voltage surges caused by inductive loads.

A simplified version of the circuit of the control unit shown in FIG. 3 is illustrated in FIG. 5. Here a relay is utilized, which for corresponding voltage intervals is in states which are opposite to those illustrated in FIGS. 3 and 4, although it performs the same functions described with reference to FIGS. 3 and 4.

Figure 6:
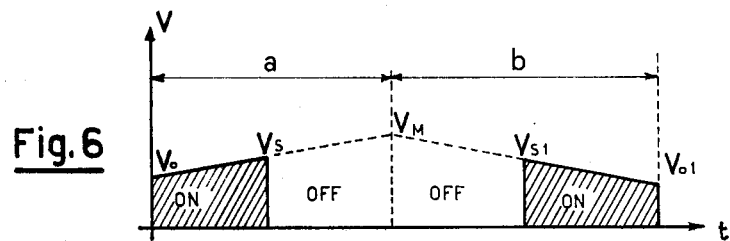
FIG. 6 shows a diagram illustrating the operation of the control circuit of FIG. 5.

This version presents the advantage of using a smaller number of components and of dissipating less energy, inasmuch as the relay R, in its normal operating condition, is, for the greater part of the time, fed at voltages which are higher than the threshold voltages, that is in the OFF zone, as illustrated in FIG. 6. In FIG. 5 the components of the circuit are indicated with reference signs similar to those used for the circuit of FIG. 3.

Therefore, with reference to FIG. 6, the non essential or optional charges are inserted in the range $V_s$–VM and VM–$V_{s_1}$ (for instance between 13.5 and 15.6 Volt), while in the range $V_o$–$V_s$ and $V_{o_1}$ and $V_{s_1}$ the essential charges are inserted (for instance between 11.8 and 13.5 Volt).

The circuit illustrated in FIG. 5 performs the control of the feed voltage by determining the change of state of the final relay R each time the applied voltage exceed the threshold voltage $V_s$, which can be pre-established by the potentiometer P, while the voltage $V_{s_1}$ is the threshold voltage in the discharge phase, corresponding to the voltage $V_s$ during the charging stage.

The circuit has been studied in such a manner that for applied voltages below $V_s$ the base current of the transistor $T_1$ is sufficient to keep it in the conduction phase (ON). When the threshold voltage $V_s$ is reached, the transistor $T_1$ blocks, since the base current is shortcircuited by the transistor $T_2$. A thermistor NTC and a resistor $s_r$ provide for the compensation of thermal surges; the diode D protects the transistor $T_1$ during the voltage surges due to inductive loads.

Therefore the essential purpose of the two units shown in FIGS. 3 and 5 is that of permitting the switching in of the optional loads only when the battery has reached a predetermined level of charge, thereby safeguarding the state of the battery and improving the utilization of the generator, the battery and also improving the power balance of the plant.

In FIG. 7 an integrated unit 30 including a differential amplifier circuit is inserted between the terminals of the battery. The threshold voltage of the battery, correspondingly to which the integrated unit turns a transistor $T_4$ on, is fed by a potentiometer P. When the battery voltage reaches this threshold level, the current which passes through transistor $T_4$ will actuate a relay R which closes the contacts which insert, into the battery fed circuit, the circuit of the optional load. Also this version may be equipped with a diode D which protects said power transistor $T_4$ from the current surges of the inductive loads.

It is understood that said differential amplifier circuit may be carried into practice in different manners according to the known technique and furthermore the integrated unit may be dimensioned so as to permit to eliminate the power transistor $T_4$.

It is clear that the embodiments shown in the figure are here given for a purely illustrative and in no way limitative purpose, and that many variants and changes may be applied to them without departing from the scope of the present invention.

What is claimed is:

1. In a generator and battery fed electric plant which includes, in addition to a circuit of essential loads, also a circuit of non-essential loads, and a device having a warning lamp in circuit for signaling when output of generator is insufficient, the improvement comprising a voltage responsive unit including solenoid of a relay fixedly connected in parallel with said warning lamp and having a pair of normally closed contacts for opening said circuit of non-essential loads whenever current flows in said solenoid and said normally closed contacts open.

2. A device according to claim 1, wherein said voltage responsive unit is connected in parallel with the circuit of the non-essential loads.

* * * * *